Jan. 15, 1957 C. H. HOEPPNER ET AL 2,777,947

PULSE WIDTH DISCRIMINATOR

Filed March 18, 1946 3 Sheets-Sheet 1

Inventors
CARL HARRISON SMITH JR.
CONRAD H. HOEPPNER

By M. A. Hayes

Attorney

Jan. 15, 1957 C. H. HOEPPNER ET AL 2,777,947

PULSE WIDTH DISCRIMINATOR

Filed March 18, 1946 3 Sheets-Sheet 2

Inventors
CARL HARRISON SMITH JR.
CONRAD H. HOEPPNER

By M. A. Hayes

Attorney

Jan. 15, 1957 C. H. HOEPPNER ET AL 2,777,947

PULSE WIDTH DISCRIMINATOR

Filed March 18, 1946 3 Sheets-Sheet 3

Inventors
CARL HARRISON SMITH JR.
CONRAD H. HOEPPNER

By M. A. Hayes

Attorney

United States Patent Office 2,777,947

Patented Jan. 15, 1957

2,777,947

PULSE WIDTH DISCRIMINATOR

Conrad H. Hoeppner, Washington, D. C., and Carl Harrison Smith, Jr., Arlington, Va.

Application March 18, 1946, Serial No. 655,355

2 Claims. (Cl. 250—27)

(Granted under Title 35, U. S. Code (1952), sec. 266)

This invention relates in general to electronic circuits and in particular to electronic circuits for pulse time duration discrimination.

In radio, radar and television it is frequently necessary to obtain a response only from a given potential variation which is combined in a circuit with a large number of other potential variations that are not required for present purposes.

To perform this function some characteristic of the desired signal must be chosen to operate a discriminator circuit which will give an output indication only in response to the desired signal.

It is an object of this invention to provide a pulse discriminator circuit, the discriminatory action of which is based on a certain definite characteristic of the desired pulse signal.

It is another object of this invention to provide a circuit which produces an output signal only in response to an input pulse signal, of a predetermined duration.

It is still another object of this invention to provide a circuit which operates to give an output indication only for negative rectangular pulses of a prescribed time duration and voltage magnitude and which is unresponsive to potential variations of other time durations.

It is still another object of this invention to provide a circuit which operates to give an output indication only for positive rectangular pulses of a prescribed time duration and voltage magnitude and which is unresponsive to potential variations of other time durations.

Other objects and features of this invention will become apparent upon careful consideration of the following detailed description when taken together with the accompanying drawings in which.

Figures 1, 3:
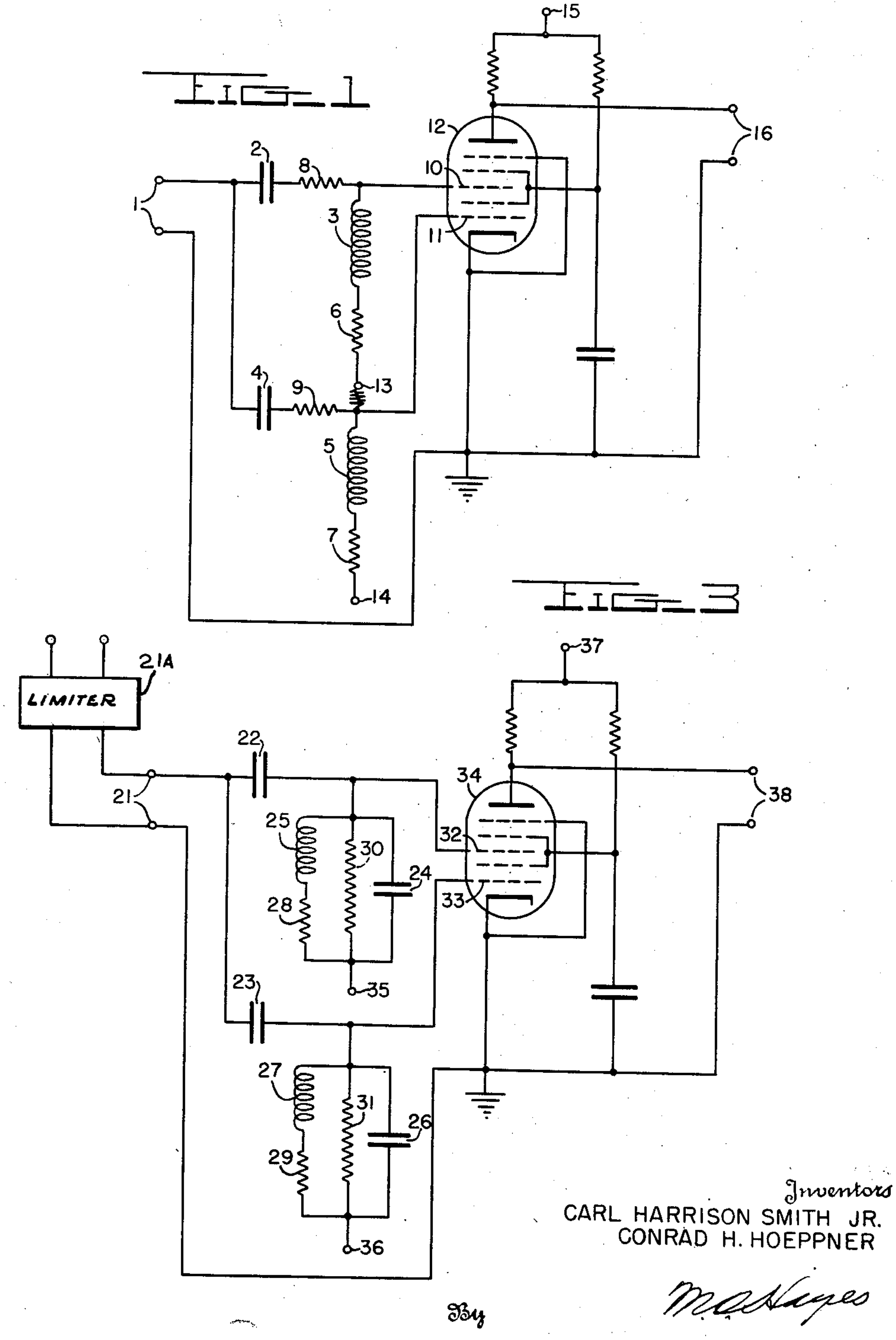
Figure 1 shows a circuit diagram of one exemplary embodiment of this invention.
Figure 3 shows a circuit diagram of another exemplary embodiment of this invention.

Referring now in particular to Figure 1 which shows an embodiment of this invention utilizing series resonant circuits and a pentagrid vacuum tube. The input terminals 1 are coupled to two resonant circuit consisting of a condenser 2 and an inductance 3 and a condenser 4 and an inductance 5 respectively. Resistances 6 and 7 represent the inherent ohmic resistances of the inductances 3 and 5 respectively. Resistances 8 and 9 may or may not be used depending on the amount of damping required in the circuits in addition to that supplied by inherent resistances 6 and 7. The two series resonant circuits are connected separately to the two control grids 10 and 11 of the pentagrid vacuum tube 12 which is operated according to its specified characteristics and normally at cutoff when no signal is applied. The terminals 13 and 14 are provided for supplying proper cutoff bias voltages for the control grids 10 and 11. The terminal 15 is provided for supplying proper plate and screen grid voltage to the pentagrid converter tube 12. The output terminals 16 are provided for obtaining output indications or for connection to associated circuits.

Figure 2:
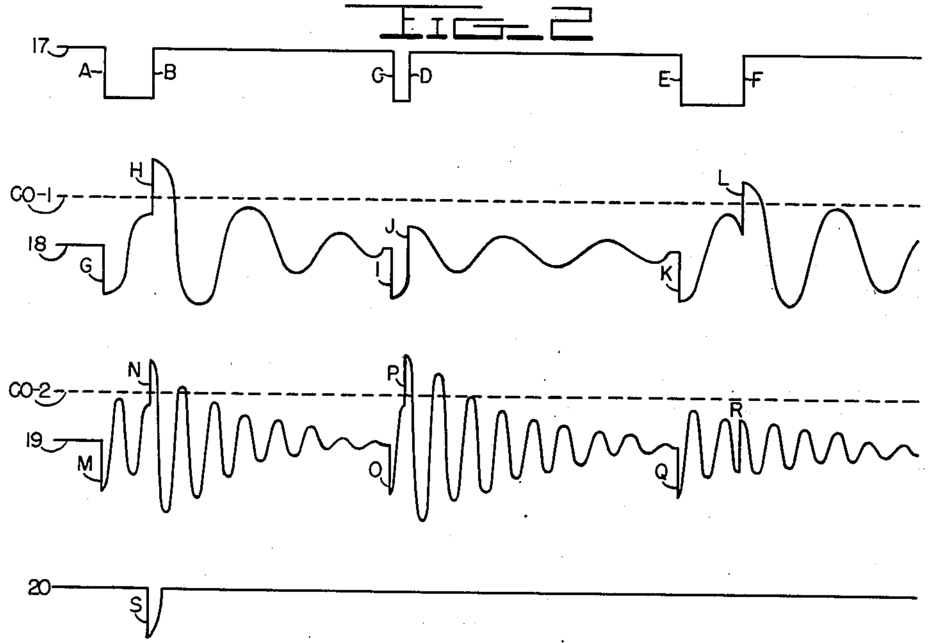
Figure 2 shows a series of waveforms which are useful in explaining the circuit of Figure 1.

Shown in Figure 2 is a series of waveforms which are useful in explaining the proper operation of the circuit of Figure 1. Waveform 17 represents a pulse that is of the prescribed time duration AB, a pulse that is too short CD, and a pulse that is too long EF to give an output signal. Waveform 17 could represent all kinds of interference and pulses of various length and magnitude except that a limiter stage should be used previous to the input terminals 1 of Figure 1 to limit the voltage magnitude of all signals to that of the prescribed pulse. However, for simplicity of explanation, waveform 17 shows only the three aforementioned pulses. Waveforms 18 and 19 representing voltages appearing on the grids 10 and 11 of the pentagrid tube 12 and the resulting output waveform 20 representing the voltage obtained at the output terminals 16 of Figure 1 are also shown.

The sudden negative change of voltage A at the beginning of the pulse 17 AB shocks the resonant circuits into oscillation at their respective resonant frequencies starting at 18G and 19M. The sudden positive change of voltage B at the end of the pulse 17 AB occurs when both oscillations are at a maximum positive voltage and shocks both resonant circuits into stronger oscillation or reinforces the oscillations of both resonant circuits causing both control grid voltages 18 and 19 simultaneously to reach a voltage extreme which is above cutoff at 18H and 19N. Cutoff voltages for the two control grids 10 and 11 of the pentagrid tube 12 in Figure 1 are represented by the dash lines CO–1 and CO–2 respectively on the waveforms 18 and 19. Only when the voltages represented by these waveforms are both above the lines CO–1 and CO–2 will the pentode tube conduct. Since both grids are driven above cutoff simultaneously by the pulse 17AB an output indication is given at terminals 16 in the form of a voltage pulse S represented on waveform 20.

The sudden negative change of voltage C at the beginning of the pulse 17CD shocks both resonant circuits into oscillation at 18I and 19–O but since this pulse is not of the proper time duration the sudden positive change D at the end of the pulse occurs when the voltage represented by waveform 18 is near its minimum value at J and the oscillations are not reinforced. Therefore the voltage does not reach a voltage extreme above cutoff CO–1 at 18J. The voltage represented by waveform 19 is at a maximum value and reinforced by the ending of the pulse 17D so that it reaches a voltage extreme above cut off CO–2 at 19P. However as stated above it is necessary for both grid voltages to reach simultaneously a voltage extreme above cutoff in order to get an output pulse on waveform 20. The sudden negative change of voltage at the beginning of the pulse 17EF shocks both resonant circuits into oscillation at 18K and 19Q, but since this pulse is not of the proper time duration the sudden positive voltage change F at the end of the pulse occurs when the voltage represented by the waveform 19 is near its minimum value and the oscillations are not reinforced. Therefore the voltage does not reach a voltage extreme above cutoff CO–2 at 19R. The voltage represented by waveform 18 is near its maximum value and is reinforced by the ending of the pulse 17F so that it does reach a voltage extreme above cutoff CO-1 at 18L. However as stated above it is necessary for both grid voltages to reach simultaneously a voltage extreme above cutoff in order to get an output pulse on waveform 20.

Since the resonant circuits in Figure 1 are damped by the inherent resistances 6 and 7 of the inductances 3 and 5 and by the addition of resistances 8 and 9, if necessary, the input pulse must have a short enough time duration to be completed within the first few cycles of oscillation of the resonant circuits in order that the reinforced oscillation will be strong enough to reach a voltage extreme above cutoff.

In the representation in Figure 2 the values of inductance and capacity of Figure 1 were so chosen that the natural period of oscillation of the voltage represented by waveform 18 is twice the prescribed pulse width and that of waveform 19 is two thirds the prescribed pulse width, one resonant frequency thus being three times the other. However other values can be used such that one resonant frequency is an odd harmonic other than unity of the other.

In Figure 3 is shown an embodiment of the invention utilizing parallel resonant circuits and a pentagrid vacuum tube. The input terminals 21 are coupled through condensers 22 and 23 to two perallel resonant circuits consisting of a condenser 24 and an inductance 25 and a condenser 26 and an inductance 27 respectively. Resistance 28 and 29 represent the inherent ohmic resistance of the inductances 25 and 27 respectively. Resistances 30 and 31 may or may not be necessary depending on the amount of damping required in the circuit in addition to that supplied by inherent resistances 28 and 29. The two parallel resonant circuits are connected separately to the two control grids 32 and 33 of the pentagrid tube 34 which is operated according to its specified characteristics and is normally at cutoff when no pulse is applied. The terminals 35 and 36 are provided for supplying proper control grid bias voltage and the terminal 37 is provided for supplying proper plate and screen grid voltages. The output terminals 38 are provided for obtaining output indications or for connection to associated circuits.

Figure 4:
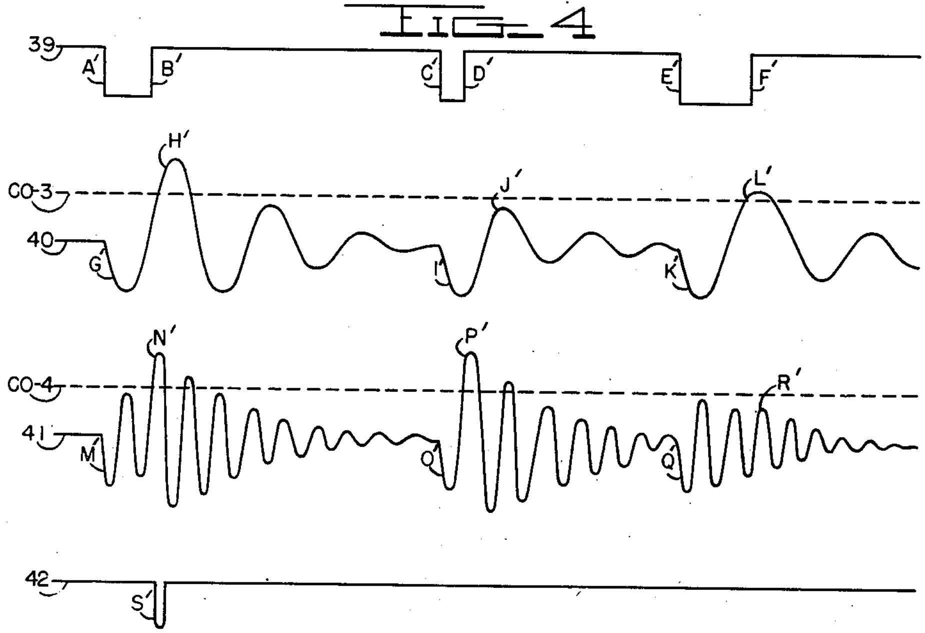
Figure 4 shows a series of waveforms useful in explaining the operation of the circuit of Figure 3.

Shown in Figure 4 is a series of waveforms which are useful in explaining the proper operation of the circuit in Figure 3. Waveform 39 represents a pulse that is of the proper time duration A'B', one that is too short C'D', and one that is too long E'F' to give an output indication. This waveworm is chosen for purposes of explanation and is representative of some of the signals that could be present at that input terminals 21 of Figure 3. A limiter stage **21*a* is provided previous to the input terminals 21 to limit the magnitude of all signals to that of the prescribed pulse. Waveforms 40 and 41 representing voltages appearing on the grids 32 and 33 of the pentagrid tube 34 and the waveform 42 representing the voltage obtained at the output terminals 38 of Figure 3 are also shown in Figure 4. Cutoff voltage for the two control grids 32 and 33 of the pentode tube 34 in Figure 3 are represented by the dash lines CO-3 and CO-4 respectively on waveforms 40 and 41** of Figure 4. When the voltages represented by these waveforms are both above the lines CO-3 and CO-4 simultaneously the pentode tube conducts to produce an output signal.

The sudden negative change of voltage at the beginning of each pulse 39A', 39C' and 39E' shocks the resonant circuits into oscillation at 40G' and 41M'; 40I' and 41-O'; and 40K' and 41Q' respectively. However, in order to obtain a voltage extreme so that both grid voltages are above cutoff simultaneously, it is necessary that the sudden change of voltage at the end of a pulse occur when both resonant circuit voltages are rising toward a positive maximum preferably at their maximum rate of change.

The pulse 39A'B' is of the proper duration to reinforce both oscillations and the sudden change of voltage B' at the end of the pulse shocks the oscillations to the voltage extremes 40H' and 41N' above cutoff causing the pentagrid tube 34 to conduct and gives a pulse S on the output waveform 42 at the output terminals 38 in Figure 3. The pulse 39C'D' is of too short a duration and partially reinforces only the higher frequency oscillations driving only the waveform 41 above cutoff CO-4 at 41P', waveform 40 remaining below cutoff CO-3 at J'.

The pulse 39E'F' is of too long a duration and partially reinforces only the slower oscillation driving only the waveform 40 above cutoff CO-3 at L', waveform 41 remaining below cutoff CO-4 at R'.

Since the resonant circuits in Figure 3 are damped by the inherent resistances 28 and 29 of the inductance 25 and 27 respectively and by the addition of resistances 30 and 31 if necessary, the input pulse must have a short enough time duration to be completed within the first few cycles of oscillation of the resonant circuits in order that the reinforced oscillations will be strong enough to reach a voltage extreme above cutoff.

In the representation in Figure 4 the values of inductance and capacity in Figure 3 were so chosen that the natural period of oscillation of the voltage represented by waveform 40 is twice the prescribed pulse width and that of waveform 41 is two thirds the prescribed pulse, one resonant frequency being three times the other. However other values can be used. For example, one resonant frequency can be any odd harmonic of the other.

Figures 5, 6:
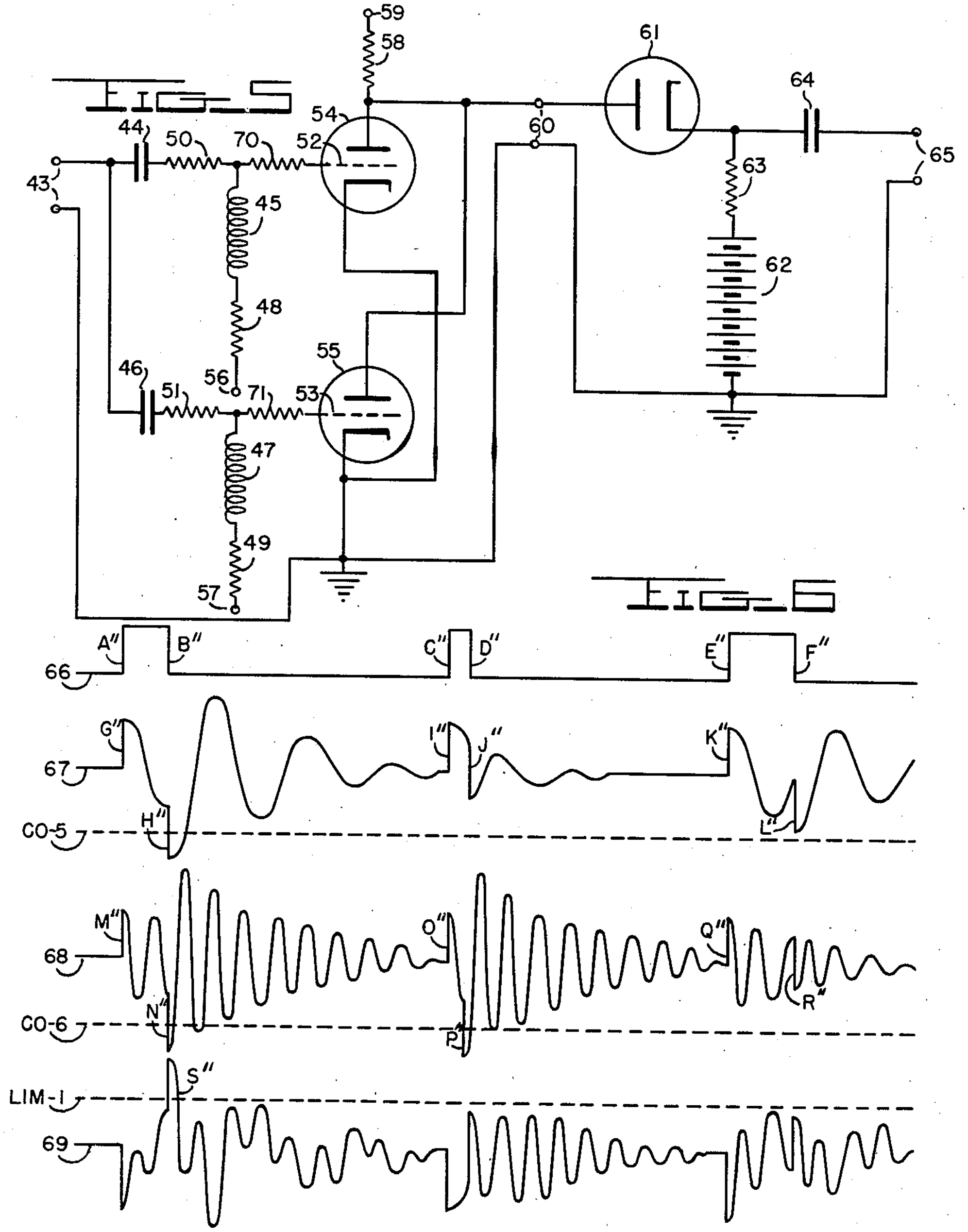
Figure 5 shows a circuit diagram of still another exemplary embodiment of this invention with a limiter or clipper stage coupled to the output terminals.
Figure 6 shows a series of waveforms useful in explaining the operation of the circuit of Figure 5.

In Figure 5 is shown an embodiment of the invention utilizing series resonant circuits and two triode vacuum tubes with a diode limiter stage coupled to the output terminals. The input terminals 43 are coupled to two resonant circuits consisting of a condenser 44 and an inductance 45 and a condenser 46 and an inductance 47 respectively. Resistances 48 and 49 are the inherent ohmic resistances of the inductances 45 and 47 respectively. Resistances 50 and 51 may or may not be used depending on the amount of damping required in the circuit in addition to that supplied by the inherent resistances 48 and 49. The two resonant circuits are coupled separately to the control grids 52 and 53 of two triode tubes 54 and 55 which are operated according to their specified characteristics and are normally conducting through a common plate load resistor 58. The terminals 56 and 57 are provided for proper bias voltages for the control grids 52 and 53. The terminal 59 is provided for supplying proper plate voltage. The output terminals 60 are provided for obtaining output indications or for connection to associated circuits such as a limiter which will remove unwanted portions of the output signal.

The limiter or clipper circuit shown in Figure 5 following the output terminals 60 comprises a diode tube 61 a source of voltage 62 a load resistor 63 and a coupling condenser 64. The limiter output terminals are provided for connection to associated circuits. The coupling condenser 64 is provided for removing the D. C. level of voltage at the limiter output terminals 65. The source of voltage 62 holds the cathode of the diode tube at a positive voltage so that the tube will not conduct until that voltage is exceeded on its plate. Therefore the signal at the limiter output terminals 65 contains only those portions of a signal at the output terminals 60 of the pulse discriminator circuit which exceed the source of voltage 62 in positive magnitude.

Shown in Figure 6 is a series of waveforms which are useful in explaining the circuit of Figure 5. Waveform 66 represents a pulse that is of the proper time duration A"B", one that is too short C"D" and one that is too long E"F" to give an output indication. This waveform is chosen for purposes of explanation and is representative of some of the signals that could be present at the input terminals 43 of Figure 5. A limiter stage should be provided previous to the input terminals 43 to limit the amplitude of all signals to that of the prescribed pulse. Waveform 67 and 68 representing voltages appearing on the grids 52 and 53 of the triode tubes 54 and 55 and the waveform 69 representing the voltage obtained at the output terminals 60 of Figure 5 are also shown in Figure 6. Cutoff voltages for the control grids 52 and 53 are represented by the dash lines CO–5 and CO–6 respectively on the waveforms 67 and 68. Only when the voltages represented by these waveforms are both below the lines CO–5 and CO–6 will there be an absence of plate current in the plate load resistor 58 of Figure 5. The dash line LIM–1 on waveform 69 represents a level below which the output signal can be eliminated by the limiter stage following the output terminals 60 of Figure 5.

The sudden positive change of voltage at the beginning of each pulse 66A″, 66C″ and 66E″ shocks the resonant circuits into oscillation at 67G″ and 68M″; 67I″ and 68–O″; and 67K″ and 68Q″ respectively. However, in order to obtain a voltage extreme so that both grid voltages are driven below cut-off simultaneously it is necessary that the sudden change of voltage at the end of a pulse occurs when both oscillations are at a minimum or most negative voltage in order to reinforce both oscillations so that they will simultaneously reach a voltage extreme below cutoff thereby cutting off both triode tubes and giving an output indication. The output indication consists of the increase in voltage existing at the output terminals 60 of Figure 5 when there is no current flowing through either triode tube 54 and 55 of Figure 5.

The pulse 66A″B″ is of the proper duration to reinforce both oscillations and the sudden change of voltage B″ at the end of pulse shocks the oscillation to the voltage extremes 67H″ and 68N″ below cutoff giving the pulse S″ on the waveform 69, which rises above the limiter level LIM–1 and will appear as a pulse at the limiter output terminals 65 of Figure 5.

The pulse 66C″D″ is of too short a duration and reinforces only the faster oscillation driving only the waveform 68 below cutoff CO–6 at P″, waveform 67 remaining above cutoff CO–5 at J″.

The pulse 66E″F″ is of too long a duration and reinforces neither oscillation both waveforms 67 and 68 remaining above cutoff CO–5 and CO–6 at L″ and R″ respectively.

The triode tubes used in the circuit of Figure 5 should have the characteristic of a low plate resistance and the plate load resistor 58 should be of a large value since a large difference in plate voltage or output voltage is desired between that existing when either or both tubes are conducting and that existing when they are both cutoff. The desired output signal is merely the rise in voltage obtained when both triode tubes 54 and 55 are cut off. The grid bias at the terminals 56 and 57 must be chosen so that the grid voltages do not swing far enough positive in oscillation to draw enough grid current to seriously damp the oscillations. Resistances 70 and 71 shown in the grid circuits of the triode tubes 54 and 55 of Figure 5 are not necessary for the operation of the circuit. However they may be used when a large input pulse is applied in order to allow the oscillations to have a greater amplitude and permit them to swing above zero grid bias without a serious damping effect.

It is not intended that this invention be limited to the exemplary embodiments shown and described. Useful changes may be made without exceeding the spirit of the invention.

The invention described herein may be manufactured and used by or for the Government of the United States of America for Government purposes without the payment of any royalty thereon or therefor.

What is claimed is:

1. A pulse discriminator circuit for accepting pulse signals of desired duration and rejecting all other pulse signals comprising, first and second resonant circuits having different resonant frequencies in odd harmonic relation such that upon being shocked into naturally damped oscillation by the beginning of a pulse-type signal of desired duration, the resulting oscillations of each will be reinforced by a second oscillation initiated by the ending of said signal, limiter means for applying uniform amplitude pulses of various widths to said first and second resonant circuits in common, and coincidence means connected to an oscillatory voltage output point in each of said resonant circuits, said coincidence means being operative to produce an output signal responsive only to simultaneous attainment of a respective reinforced voltage extreme at each of said output points.

2. A pulse discriminator circuit for accepting pulse signals of desired duration and rejecting all other pulse signals comprising, a first resonant circuit whose natural period of oscillation is substantially two times the duration of a desired input signal, a second resonant circuit whose natural frequency is an odd harmonic other than unity of the frequency of said first resonant circuit, a limiter means for applying uniform amplitude input pulses of various widths to said first and second resonant circuits in common, and coincidence means connected to an oscillatory voltage output point on each of said resonant circuits, said coincidence means being operative to produce an output signal responsive only to the simultaneous attainment of a respective reinforced voltage extreme at each of said output points.

References Cited in the file of this patent

UNITED STATES PATENTS

| | | |
|---|---|---|
| 2,224,134 | Blumlein | Dec. 10, 1940 |
| 2,226,459 | Bingley | Dec. 24, 1940 |
| 2,230,243 | Haffcke | Feb. 4, 1941 |
| 2,277,000 | Bingley | Mar. 17, 1942 |
| 2,408,063 | Grieg | Sept. 24, 1946 |
| 2,411,547 | Labin et al. | Nov. 26, 1946 |
| 2,416,895 | Bartelink | Mar. 4, 1947 |
| 2,504,976 | Grieg | Apr. 25, 1950 |